United States Patent [19]

Armfield, III

[11] 4,373,280

[45] Feb. 15, 1983

[54] X-RAY VIEWING APPARATUS

[76] Inventor: Samuel L. Armfield, III, 522 Foltz Dr., Verona, Pa. 15147

[21] Appl. No.: 196,350

[22] Filed: Oct. 14, 1980

[51] Int. Cl.³ .................... G02B 27/02; A47F 7/14; B60R 1/02; A47G 1/16
[52] U.S. Cl. .................... 40/367; 40/23 R; 40/361; 248/475 R; 353/DIG. 5
[58] Field of Search ............. 40/361, 554, 11 R, 559, 40/10 R, 23 R, 362, 366, 367, 575, 348, 349, 158 B; 250/480, 477; 354/276, 278, 279; 211/45, 89, 94.5; 248/475 R; 353/DIG. 1, DIG. 5

[56] References Cited

U.S. PATENT DOCUMENTS

| 1,172,426 | 2/1916 | Caldwell | 40/361 |
| 1,988,654 | 1/1935 | Haag | 40/132 |
| 2,436,162 | 2/1948 | Cadenas | 40/132 |
| 2,682,463 | 6/1954 | Olsen | 40/361 |
| 2,760,288 | 8/1956 | Schoenfeld | 40/361 |
| 3,201,883 | 8/1965 | Schleisner-Meyer | 40/106.1 |
| 3,350,045 | 10/1967 | Mayers | 248/475 R |
| 4,004,360 | 1/1977 | Hammond | 40/106.1 |

FOREIGN PATENT DOCUMENTS

| 2360459 | 6/1975 | Fed. Rep. of Germany | 40/361 |
| 52-19530 | 2/1977 | Japan | 40/361 |
| 1084264 | 9/1967 | United Kingdom | 40/361 |

Primary Examiner—Gene Mancene
Assistant Examiner—Michael J. Foycik, Jr.
Attorney, Agent, or Firm—Carothers & Carothers

[57] ABSTRACT

A box structure having a light source therein and a light transmission panel on the front thereof to receive X-ray films thereon for viewing with back-light illumination is provided with a horizontal cross bar detachably secured across the light transmission panel at a predetermined vertical position to divide the viewing screen into upper and lower viewing areas. The bottom of the cross bar is provided with a portion for detachably retaining a film edge for viewing of a film in the lower viewing area, and shades are horizontally secured at the top or bottom of the front of the box structure and are vertically drawable to cover at least an underlying portion of the light transmission panel to reduce glare.

5 Claims, 4 Drawing Figures

X-RAY VIEWING APPARATUS

BACKGROUND OF THE INVENTION

The present invention relates generally to a film viewer and more particularly to apparatus for holding and back illuminating X-ray film.

Medical X-ray films usually are examined by placing them on the viewing screen of a device commonly referred to as an illuminator or X-ray viewer. Most conventional X-ray viewing boxes have a fluorescent illumination source within the box and a standard viewing size screen of 14 inches by 17 inches. Some of the viewing boxes have a single 14 by 17 panel, and others have multiple such panels. Generally when such multiple panels are provided, they are provided in a side-by-side series with means for illuminating each panel independently of the next. Other prior art viewing boxes not only have 14 by 17 inch multiple panels laid side by side, but in addition provide a second series of such panels above or below the first series. For example, see the X-ray Viewer disclosed in U.S. Pat. No. 3,201,883 issued on Aug. 24, 1965 to S. L. Schleisner-Meyer.

However, there is currently a widespread use of smaller X-ray film measuring 8 inches by 10 inches for use in ultrasound, nuclear medicine; and CT films smaller than 14 inches by 17 inches are frequently used for other examinations. 70 mm and 100 mm films are also popular.

Conventional X-ray film viewing apparatus are ineffective and inefficient when using smaller films because there is no way to hold two 8 inch by 10 inch films on a 14 inch by 17 inch view box illumination panel and still having capabilities to use the box for reading 14 inch by 17 inch chest X-rays when small films are not being viewed.

When a film smaller than 14 inches by 17 inches is to be examined, for example, on a 14 inch by 17 inch viewing screen, the film is retained in a conventional manner on the surface of the viewing screen by pushing the upper edge on the film under a spring-loaded clip located along the top edge of the viewing screen. This leaves the bottom portion of the screen surrounding the film or films illuminated and the resulting glare detracts from the visual perception of the person trying to study the film and creates considerable eye strain, particularly if viewing is done over a long period of time.

Both of these aforementioned problems have been solved in one form by the self-masking X-ray viewing apparatus disclosed in U.S. Pat. No. 4,004,360 issued Jan. 25, 1977 to K. C. Hammond. This particular prior art apparatus discloses a relatively complex viewing device which does indeed eliminate unnecessary glare and further at the same time permits viewing of film smaller than 14 inches by 17 inches. However, a problem remains in that this prior art device must be independently manufactured and accordingly provides no means for adapting existing X-ray film viewing apparatus to accomplish these results of eliminating glare and providing a means for viewing multiple smaller X-ray films on a conventional 14 inch by 17 inch illumination screen already in use or on the market.

As illustrated in U.S. Pat. No. 2,436,162 issued Feb. 17, 1948 to F. J. Cadenas and U.S. Pat. No. 1,988,654 issued Jan. 22, 1935 to T. T. Haag, other prior art X-ray film viewers have eliminated the problem of glare by the use of masking plates or drawable shades to block off that portion of the viewing screen which is not illuminating an X-ray film. However, such film viewers do not provide means to adapt a single or multiple 14 inch by 17 inch viewing screen so that each such panel may be fully utilized by placing a number of smaller X-ray films over its entire viewing area while further providing means to mask off unwanted surrounding glare, and thereafter providing means to readily re-adapt the viewing box to receive full sized 14 inch by 17 inch X-rays for viewing.

It is a principal object of the present invention to provide an X-ray viewing apparatus which eliminates these aforementioned disadvantages, and in so doing provide a means to readily adapt existing viewing apparatus on the market to do so.

SUMMARY OF THE INVENTION

The X-ray viewing apparatus of the present invention may be provided in the form of a temporary or permanent adaptation of existing or conventional X-ray viewing boxes or illuminators. The apparatus of the present invention comprises a box structure having a light source therein and a light transmission panel in the front thereof to receive X-ray films for viewing with backlight illumination from the light source. A horizontal cross bar is detachably secured across the light transmission panel at a predetermined vertical position to divide the viewing screen into upper and lower viewing areas. Means are further provided on the bottom of this cross bar for detachably retaining the top edge of a film for viewing of such a film in the lower viewing areas of the screen. The upper edge of the screen is already provided with a conventional spring clip for retaining the upper edge of a film. Shade means are further provided and horizontally secured at the top or bottom of the front of the box structure and these shades are vertically drawable to cover at least an underlying portion of the light transmission panel.

This horizontal bar which divides the viewing screen into more vertical useable viewing area for smaller X-ray films may be attached to the viewing box by any quick detach methods such as suction cups and the like. In another variation, two spaced vertical side rails may be attached to opposite side ends of the box structure and then one or more of the aforementioned horizontal cross bars is received at opposite ends on these side rails for vertical movement or positioning therealong in order that the cross bar or bars may be vertically positioned at predetermined locations to vertically divide the viewing screen as desired to accomodate smaller size X-ray films for viewing. When the cross bar is not needed, it is simply removed, and in addition, such side rails on which it is received and guided may also be detachable or provided with mechanisms to pivot them out of the way.

The shade means generally will comprise a plurality of shades, one draw shade for each illumination panel. In yet another variation, when a plurality of such shades are provided for masking portions of the screen, they are generally positioned side by side and may be temporarily or detachably secured together so that when one shade is drawn all shades will be simultaneously drawn, yet, the shades may be disconnected one from another so that each shade may be drawn independently. The shades may be conventional spring-loaded coil type shades or any conventional type draw shade. The shades may also be detachably securable to the aforesaid cross bar when the shades are drawn, so that the area of any one illumination panel below the cross bar may be masked.

In a preferable form, the means to detachably retain a film edge consists of a longitudinal V-shaped groove in the bottom of the aforesaid cross bar such that the film edge may be forced into the groove and thereby retained.

A plurality of the cross bars may be provided in parallel alignment in order to vertically divide the illumination panels in more than two viewing areas in order to adapt the viewing screens to even smaller X-ray films, and the cross bars may be adjusted in vertical position to adapt to various sizes of X-ray films for viewing.

BRIEF DESCRIPTION OF THE DRAWINGS

Other objects and advantages appear in the following description and claims.

The accompanying drawings show, for the purpose of exemplification without limiting the invention or the claims thereto, certain practical embodiments illustrating the principles of this invention wherein:

DETAILED DESCRIPTION OF THE PREFERRED EMBODIMENT

Figure 1:
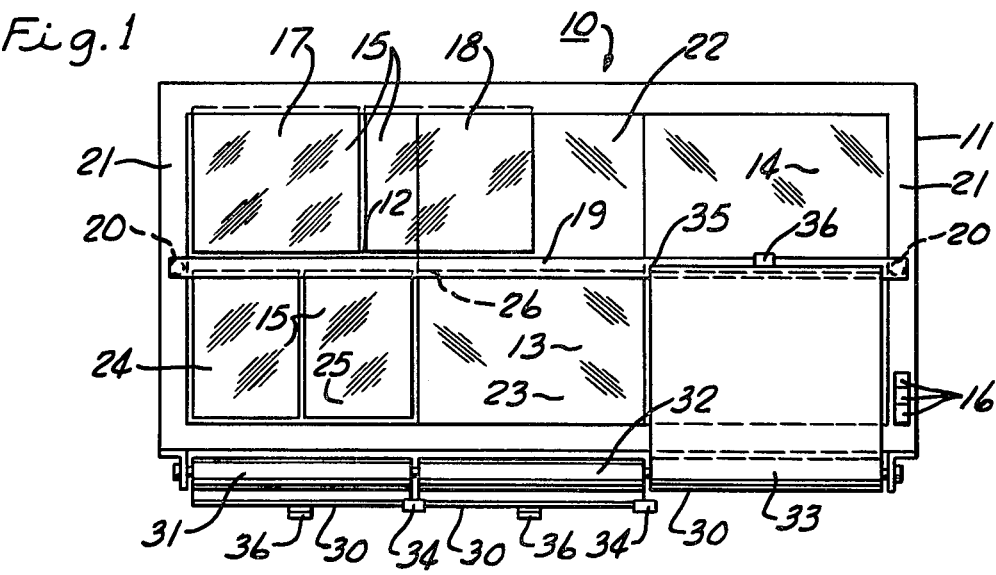
FIG. 1 is a view in front elevation of one embodiment of the X-ray viewing apparatus of the present invention.

Referring to FIG. 1, the X-ray viewer 10 is basically a conventional X-ray viewer which may be readily purchased on the market, and further adapted with the apparatus of the present invention. The film viewer basically comprises a box structure 11 having three light-transmission panels, 12, 13 and 14, on the front thereof which are generally 14 inches by 17 inches each. These panels are of a transluscent material which will transmit light therethrough from a light source (not shown) within box structure 11 to illuminate the X-ray films 15 for viewing.

The light source within the box structure 11 is generally a fluorescent light and a separate or independent light source is provided to illuminate each panel 12, 13 and 14 separately, and accordingly switches 16 are provided to respectively connect a power source to each one of the light sources behind the respective viewing screens 12, 13 and 14.

Normally, a full size X-ray such as a chest X-ray will be approximately 14 inches by 17 inches and will fill or cover one entire panel 12, 13 or 14. However, in the Figure, smaller X-ray films are illustrated. The uppermost X-ray films 15 designated 17 and 18 are retained on the illumination screens 12 and 13 in the conventional manner by a spring clip at the top of box structure 11.

In order to adapt the viewing apparatus to also view small X-rays on the bottom portion thereof, horizontal cross bar 19 is provided which is detachably secured across the light transmission panels 12, 13 and 14 by means of suction cups 20, at opposite ends thereof. The suction cups 20 are secured to the front panel side frames 21 of the structure 11. Thus, in this manner, the cross bar 19 can be detachably secured across the light transmission panels at any predetermined vertical position to divide the entire viewing screen made up of panels 12, 13 and 14 into upper and lower viewing areas 22 and 23 respectively.

Figure 2:
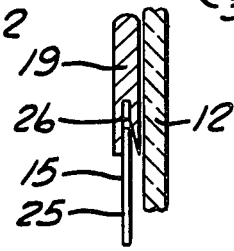
FIG. 2 is an enlarged view in cross section of a portion of the cross bar horizontally bridging the center of the viewing apparatus of FIG. 1 shown in conjunction with a portion of an X-ray film being gripped by the bottom of the cross bar and in further association with a cross-sectional portion of the underlying translucent viewing screen.

The cross bar 19 is further provided with means on the bottom thereof to detachably retain an edge of an X-ray film for viewing of a film in the lower viewing area 23. In the Figure, the lower X-ray films 15 designated as 24 and 25, have their upper edges retained by the bottom of cross bar 19 by means of a longitudinal V-shaped groove 26 in the bottom of cross bar 19. This is better illustrated in the enlarged drawing of FIG. 2. In this Figure, the cross bar 19 is illustrated in cross section and so also is an underlying portion of transluscent viewing screen 12. Here, the cross section of groove 26 is illustrated as receiving the upper edge of X-ray film 25. Cross bar 19 is made of a slightly flexible material so that when the upper edge of film 25 is jammed or pushed into groove 26, it clamps the top edge of the film and retains that film for viewing.

Shade means 30 is further provided at the bottom of the front of box structure 11, and they are vertically drawable to cover at least an underlying portion of the light transmission panel 12, 13, and 14.

In this Figure, the shade means 30 consists of three independent spring-loaded, coiled shades 31, 32 and 33, so that each of the panels 12, 13 and 14 may be independently covered to the degree desired. Here the shades are illustrated in a side-by-side series at the bottom of box structure 11. However, the shades may be provided at the top instead of the bottom of box structure 11. The shade structure illustrated is the most convenient.

In addition, small clips 34 are provided between adjacent shades 31, 32 and 33 to detachably secure the edges of adjacent shades 31 and 32 together or 32 and 33 together, so that if any one of the shades is drawn, the other shade will be simultaneously drawn with it. In the illustration of FIG. 1, shade 33 is shown in a drawn position wherein it has been unclipped from clip 34 so that shades 31 and 32 are not simultaneously drawn with it. However, if one desires to simultaneously draw all three shades at the same time, clip 34 would be secured to the top edge 35 of shade 33 and then when shade 32 is pulled or drawn, all three shades draw simultaneously therewith.

The coil shades illustrated are probably the most convenient, as they tend to take up the least amount of room in their stored and coiled position. However, other shades may be employed, such as solid or flexible flat draw shades.

Each of the shades 31, 32 and 33 is provided with an end hook 36 to detachably secure each of the shades when drawn to the top or cross bar 19 as illustrated with hook 36 connected to the free end of shade 33.

Figure 3:
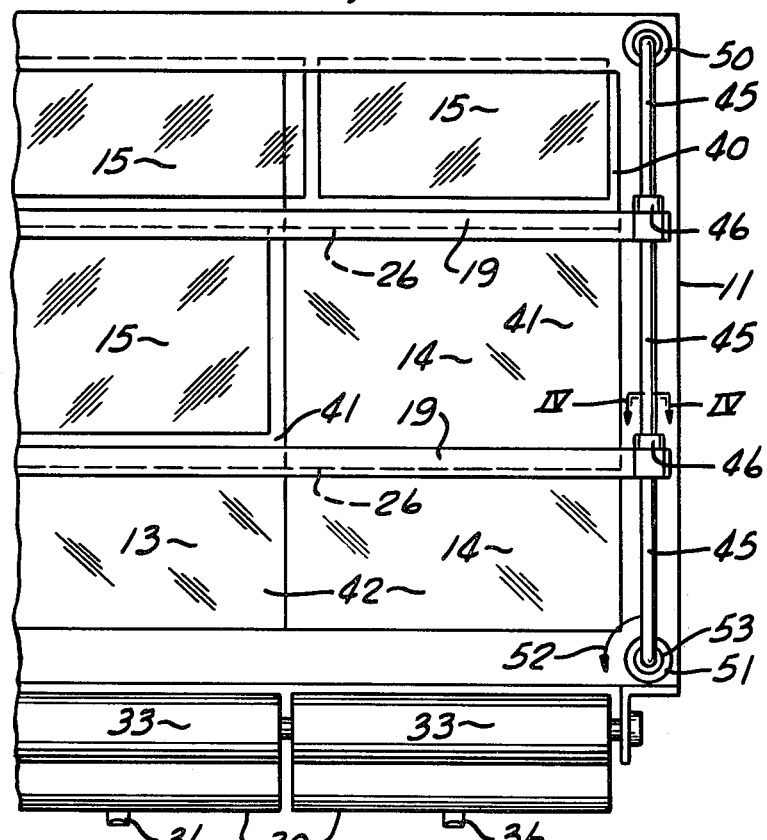
FIG. 3 is a view in front elevation of another embodiment of the X-ray viewing apparatus of the present invention with portions removed.

Referring next to FIG. 3, another embodiment of the present invention is illustrated wherein a plurality of cross bars 19 are employed. It should be noted that the cross bar in FIG. 1 is of a non-transparent material, whereas cross bar 19 is of a transparent material. In this Figure, the box structure 11 is basically the same structure as illustrated in FIG. 1, and like elements of the present invention secured thereto are designated with the same reference numerals. The parts of the box structure 11 are also designated with the same reference numerals as illustrated in FIG. 1.

In the structure of FIG. 3, the X-ray viewing apparatus 10 is provided with a plurality of cross bars and each of these cross bars is also detachably secured across the illumination panels in parallel alignment to divide the panel into more than two vertical positioned viewing areas, in this instance into three viewing areas 40, 41 and 42. In this manner, many more smaller X-ray films can be viewed at one time and the shades 30 can be drawn up to the lowermost cross bar 19 or up to the uppermost cross bar 19, and there secured to mask out illuminated areas of each screen portion 13 or 14 when an X-ray film is not positioned there for viewing.

In the embodiment of FIG. 3, two spaced vertical side rails are provided at each end of box structure 11. In this Figure, only the right-hand vertical rail 45 is illustrated for convenience of illustration. This vertical side rail 45, as well as the other side rail on the opposite end of the apparatus which is not illustrated, is either secured permanently or temporarily on the viewer box 11, and the horizontal cross bars 19 are in turn received on these side rails 45 for vertical movement therealong. The opposite ends of cross bars 19 are provided with small grooves to receive side rails 45, and are further provided with spring clips 46 which clip around and grip the vertical side rails 45 to hold the cross bars 19 in position.

Figure 4:
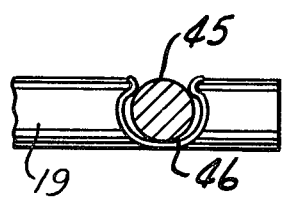
FIG. 4 is an enlarged plan sectional view of a portion of the apparatus illustrated in FIG. 3 as seen along section line IV—IV.

An enlarged view of these metal clips 46 engaging vertical rails 45 is illustrated in FIG. 4. Spring clips 46 literally snap around vertical side rails 45 and grip the rails 45 so that the cross bars 19 will stay in the desired vertical position which is selected to accommodate the proper size of X-ray film being viewed. With this type of clip arrangement 46, the cross bars 19 may be readily removed from the structure by simply snapping them off of vertical side rails 45. Also, cross bars 19 may be readily repositioned to different vertical positions by simply sliding them up and down side rails 45. The surface of side rails 45 may also be roughened or serrated so that the clips do not slip too easily and cause cross bars 19 to lose their position accidentally.

Any type of conventional clip may be substituted for clip 46 to permit vertical repositioning of cross bars 19 onto side rails 45.

In addition, side rails 45 may also be removable and secured by suction cups at their ends 50 and 51, or just the top end 50 may be detachable by suction cup, magnet, or the like, and then the bar may be rotated down and out of the way as indicated by arrow 52 about pivot joint 53 when not in use.

I claim:

1. An adaptor for an X-ray viewer having an illuminated viewing panel, comprising, at least one horizontal cross bar secured across said viewing panel and movable to different vertical positions thereacross, means on a bottom edge of said cross bar to detachably retain a film edge, shade means on said X-ray viewer movable to shade lower areas of said illuminated panel while selectively permitting upper areas thereof directly above said lower shaded areas to remain unshaded, said shade means including at least two shades positioned side-by-side, including means to detachably secure said shade to said cross bar when said shades are drawn.

2. An adaptor for an X-ray viewer having an illuminated viewing panel, comprising, at least one horizontal cross bar secured across said viewing panel and movable to different vertical positions thereacross, means on a bottom edge of said cross bar to detachably retain a film edge, including two spaced vertical side rails and means to secure said rails on said X-ray viewer, said at least one cross bar received on said side rails for vertical movement and positioning therealong.

3. The adaptor of claim 2, including a plurality of said cross bars slidably received on said side rails in parallel arrangement.

4. The adaptor of claim 2, wherein said cross bar is detachably removable from said side rails.

5. An X-ray viewing apparatus comprising a box structure having a light source therein and a light transmission panel on the front thereof to receive X-ray films thereon for viewing with back-light illumination from said light source, a horizontal cross bar positioned across said light transmission panel at a predetermined vertical position to divide said viewing panel into upper and lower viewing areas, means on a bottom edge of said cross bar for detachably retaining a film edge for viewing of a film in said lower viewing area, and shade means on the front of said box structure and movable to shade at least a portion of said lower viewing area of said light transmission panel while selectively permitting a portion of said upper viewing area directly above said shaded portion to remain unshaded, wherein said shade means includes at least two shades positioned side-by-side, including means to detachably secure said shade to said cross bar when said shades are drawn.

* * * * *